(12) United States Patent
Yavilevich (10) Patent No.: US 9,792,365 B2
(45) Date of Patent: Oct. 17, 2017

(54) METHOD AND SYSTEM FOR TRACKING AND GATHERING MULTIVARIATE TESTING DATA

(71) Applicant: Clicktale Ltd., Ramat Gan (IL)

(72) Inventor: Arik Yavilevich, Ashdod (IL)

(73) Assignee: ClickTale Ltd., Ramat Gan (IL)

( * ) Notice: Subject to any disclaimer, the term of this patent is extended or adjusted under 35 U.S.C. 154(b) by 374 days.

(21) Appl. No.: 14/584,384

(22) Filed: Dec. 29, 2014

(65) Prior Publication Data

US 2015/0186521 A1 Jul. 2, 2015

Related U.S. Application Data

(60) Provisional application No. 61/922,342, filed on Dec. 31, 2013.

(51) Int. Cl.
*G06F 17/30* (2006.01)
*H04L 29/08* (2006.01)

(52) U.S. Cl.
CPC .... *G06F 17/30864* (2013.01); *G06F 17/3089* (2013.01); *G06F 17/30867* (2013.01); *G06F 17/30893* (2013.01); *H04L 67/02* (2013.01)

(58) Field of Classification Search
CPC .... H04L 67/02; G06Q 30/0631; G06Q 30/02; G06Q 30/0282; G06Q 30/0256; G06Q 10/105; G06K 9/00; G06F 17/27; G06F 17/2247; G06F 17/00; G06F 17/30864; G06F 17/30867; G06F 17/3089; G06F 17/30893; A61B 5/00
See application file for complete search history.

(56) References Cited

U.S. PATENT DOCUMENTS

| 7,783,521 | B2 † | 8/2010 | Farquharson |
| 8,112,312 | B2 | 2/2012 | Ritter |
| 8,296,643 | B1 | 10/2012 | Vasilik |
| 2005/0262063 | A1 | 11/2005 | Conboy et al. |
| 2006/0277102 | A1 | 12/2006 | Agliozzo |
| 2008/0275980 | A1* | 11/2008 | Hansen ........... G06Q 30/02 709/224 |

(Continued)

FOREIGN PATENT DOCUMENTS

WO 2005071560 A1 8/2005

OTHER PUBLICATIONS

The International Search Report and The Written Opinion of the International Searching Authority for PCT/US2014/072524, ISA/RU, Moscow, Russia, Jun. 25, 2015.

*Primary Examiner* — Le H Luu
(74) *Attorney, Agent, or Firm* — M&B IP Analysts, LLC (57) ABSTRACT

A system and method for tracking and gathering data respective of multivariate testing on a plurality of webpages are provided. The method includes crawling through a plurality of servers hosting the plurality of webpages; for each uniform resource locator (URL) of a webpage of the plurality of webpages encountered during the crawling: sending a request to download the webpage identified by the URL; downloading at least one page view of the webpage; analyzing the at least one downloaded page view to identify data related to at least a multivariate test; and saving data identifying the at least a multivariate test performed in the plurality of webpages in a data store.

23 Claims, 8 Drawing Sheets

(56) References Cited

U.S. PATENT DOCUMENTS

| | | | |
|---|---|---|---|
| 2011/0105856 A1* | 5/2011 | Haines | A61B 5/00 600/300 |
| 2011/0161825 A1 | 6/2011 | Tierney et al. | |
| 2011/0219295 A1* | 9/2011 | Adams | G06F 17/00 715/234 |
| 2012/0290399 A1* | 11/2012 | England | G06Q 30/0282 705/14.66 |
| 2013/0187926 A1* | 7/2013 | Silverstein | G06Q 10/105 345/440 |
| 2013/0191723 A1* | 7/2013 | Pappas | G06F 17/2247 715/234 |
| 2013/0219307 A1 | 8/2013 | Raber et al. | |
| 2013/0227078 A1* | 8/2013 | Wei | H04L 67/02 709/219 |
| 2014/0079297 A1* | 3/2014 | Tadayon | G06K 9/00 382/118 |
| 2014/0215323 A1 | 7/2014 | Nelson et al. | |
| 2014/0258002 A1* | 9/2014 | Zimmerman | G06Q 30/0256 705/14.72 |
| 2014/0279196 A1* | 9/2014 | Wilson | G06Q 30/0631 705/26.7 |
| 2015/0106157 A1* | 4/2015 | Chang | G06F 17/27 705/7.29 |

\* cited by examiner
† cited by third party

```
{
    "variations": {
        "3": {
            "code": "void;", "name": "a"
        },
        "7": {
            "code": "void;", "name": "b"
        }
    },
    "tests": {
        "0": {
            "variation_ids": [
                "3",
                "7"
            ],
            "name": "Test",
            "conditions": [
                {
                    "type": "url",
                    "values": [
                        {
                            "value": "http://site.com/cond",
                            "match": "simple"
                        }
                    ]
                },
                {
                    "only_first_time": true,
                    "type": "visitor", "value": "all"
                }
            ]
        },
    },
    "goals": [
        {
            "name": "clicked_on_x_order",
            "tests": {
                "0": true
            },
            "selector": "a#x"
        },
        {
            "name": "clicked_on_y_order",
            "tests": {
                "0": true
            },
            "selector": "a#y"
        },
        {
            "name": "clicked_on_z_order", "tests":
            {
                "0": true
            },
            "selector": "a#z"
        }
    ]
}
```

METHOD AND SYSTEM FOR TRACKING AND GATHERING MULTIVARIATE TESTING DATA

CROSS REFERENCE TO RELATED APPLICATIONS

This application claims the benefit of U.S. provisional application No. 61/922,342 filed on Dec. 31, 2013, the contents of which are herein incorporated by reference.

TECHNICAL FIELD

This disclosure generally relates to techniques for evaluating changes to a website, and particularly to techniques for tracking and gathering multivariate testing data.

BACKGROUND

The Internet is made up of a collection of disparate computer systems which use a common protocol to communicate with each other. A common use of the Internet is to access World Wide Web pages (webpages). Webpages are typically stored on a web server and may be remotely accessed by a client over the Internet using a web browser. A website is a collection of webpages. A website typically includes a home page and a hierarchical order of follow-on webpages that are accessible through the home page. The webpages are connected to each other using hypertext links. The hypertext links allow a user to browse webpages of a website by selecting the links between the webpages. Distinct websites may be respectively identified by respective distinct associated Internet domain names.

To increase user visitations and revenue, websites' owners have sought to make their websites become much more sophisticated. Websites typically include webpages that provide information to users, advertise products or services to users, and/or provide site search functions for users. A problem for website owners is determining how successful the website is, for example, whether the informational or other needs of users are being met and whether the users are purchasing advertised goods and services. Websites' owners always explore ways to achieve the goal of increasing their traffic.

One approach to achieving this goal is to check if changing the design of the website, the layout of the website, the content provided by the website, or the content delivery method would attract more users. In the related art, such aspects are checked using multivariate testing. In multivariate testing, different versions of the same webpage are delivered to different users to determine whether users prefer a certain version of that webpage. The users' interactions with the different versions of the same webpage are tracked. This user behavior can be used by the website designers to improve their design, layout, and content for better user experiences or higher conversion rates. Other testing methods include A/B tests and split tests.

In some such testing systems, web servers that receive requests from users to access a webpage re-direct traffic to the different versions of that webpage using persistent information, such as cookies. The webpage version that is delivered to the user is then persistently saved in a user's cookies or tied to a user's cookie identifier. For example, a certain percentage of all traffic to the web server receives each version. In testing systems discussed in the related art, the testing process can be performed on the server side, on the client side, and/or by a third party testing service that the owner configures. In some implementations, the alternative versions occur as redirects to separate webpages, and in other systems, the alternative versions appear as changes to sub-portions of the base page.

In the related art, there are various techniques to modify the code of the webpage to allow for multivariate testing. Further, the testing for one webpage may be different than that of another page. The multivariate tests are typically performed by different service providers. Due to, e.g., data ownership and privacy regulations, a service provider can test multiple different websites, but cannot share the results with persons or companies other than the owners of the websites. Further, different testing providers cannot share the testing results among other testing or service providers.

Consequently, in the related art, there is no existing solution for gathering multivariate tests performed by different testing services. In addition, there is no tool for analyzing multivariate tests performed across different websites. Thus, the ability to evaluate the changes to (or modified version of) a website is limited only to the one site.

SUMMARY

A summary of several example aspects of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all aspects. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments disclosed herein include a method for tracking and gathering data respective of multivariate testing on a plurality of webpages. The method comprises crawling through a plurality of servers hosting the plurality of webpages; for each uniform resource locator (URL) of a webpage of the plurality of webpages encountered during the crawling; sending a request to download the webpage identified by the URL; downloading at least one page view of the webpage; analyzing the at least one downloaded page view to identify data related to at least a multivariate test; and saving data identifying the at least a multivariate test performed in the plurality of webpages in a data store.

Certain embodiments disclosed herein also include a system for tracking and gathering data respective of multivariate testing on a plurality of webpages. The system comprises a processing system; and a memory coupled to the processing system, the memory containing instructions that, when executed by the processor, configure the system to: crawling through a plurality of servers hosting the plurality of webpages; for each uniform resource locator (URL) of a webpage of the plurality of webpages encountered during the crawling; send a request to download the webpage identified by the URL; download at least one page view of the webpage; analyze the at least one downloaded page view to identify data related to at least a multivariate test; and save data identifying the at least a multivariate test performed in the plurality of webpages in a data store.

BRIEF DESCRIPTION OF DRAWINGS

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 1:
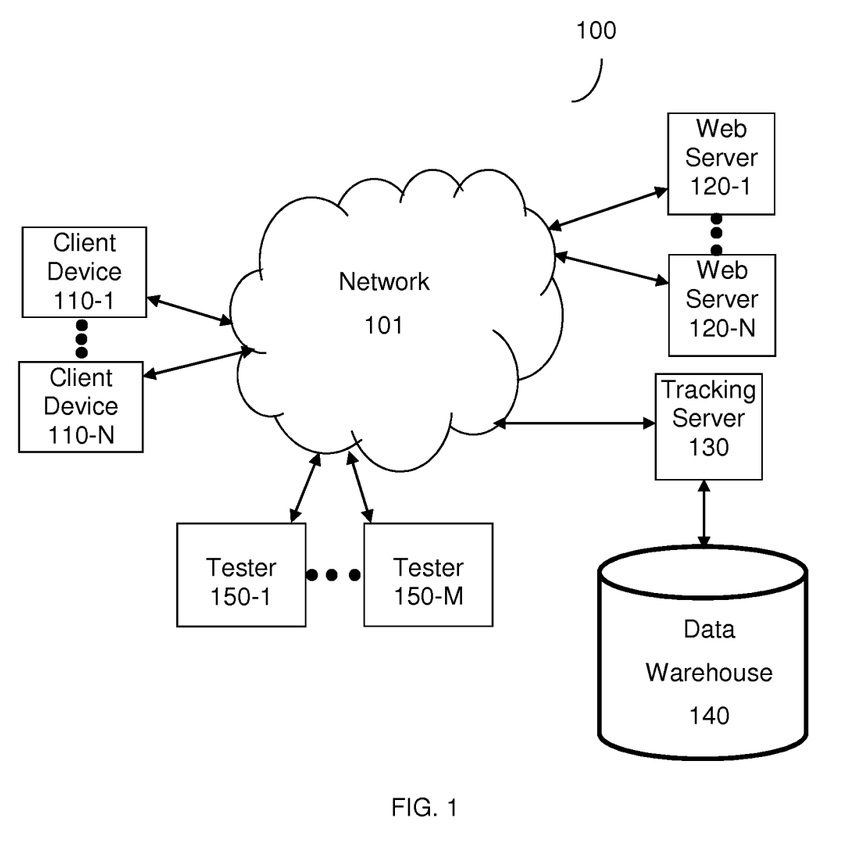
FIG. 1 is a diagram of a network system utilized to describe the various embodiments.

FIG. 1 shows an exemplary and non-limiting diagram of a network system 100 utilized to describe various disclosed embodiments. The system 100 includes client devices 110-1 through 110-N (hereinafter referred to individually as a client device 110 and collectively as client devices 110) communicatively connected to a network 101. Also communicatively connected to the network 101 are a plurality of web servers 120-1 through 120-N (hereinafter referred to individually as a web server 120 and collectively as web servers 120), a tracking server 130, a data warehouse 140, and a plurality of multivariate testers 150-1 through 150-M (hereinafter referred to individually as a multivariate tester 150 and collectively as multivariate testers 150).

The client devices 110 can access, download, and render webpages hosted by the web servers 120. A client device 110 may be, but is not limited to, a smart phone, a tablet computer, a personal computer, a laptop computer, a netbook computer, an electronic reader, a wearable computing device, and the like. The processor of the client device 110 runs an operating system that may include iOS®, Android®, Unix®, Windows®, and the like.

Each of the testers 150 may be realized as a server, a device, or a system configured to distribute test specifications, collect test results, and analyze such results, and the like. The multivariate testers 150 run multivariate tests on the websites hosted by the web servers 120. As noted above, multivariate testing is a process by which more than one aspect of a website is tested in a live environment. The multivariate testing can test the effectiveness of many different variations (or versions) related to the appearance, functionality, and content delivery of the website. It should be noted that multivariate testing may include tests other than multivariate tests such as, but not limited to, A/B tests, split tests, and the like. Thus, any tester 150 can also perform A/B tests and/or split tests to determine the better of two content variations.

For example, a tester 150-1 is configured to test if a red color background of a webpage is "better" ("better" may be defined according to the user's desires, but likely means "tending to generate a higher frequency of desirable behavior, such as purchases, engagements, sign ups, lead generation, attempts to contact the site owner through a 'contact us' link, etc., on the website") than a blue color background. Thus, a client device 110-1 accessing the website can view one version (red color background) while the client device 110-N can view the blue color background. The tester 150-1 is configured to collect statistics on users' behavior with respect to the webpage's content under testing conditions. The tests are performed by modifying the code (e.g., HTML or JavaScript code) of the webpages hosted by a web server 120 hosting the website under test. Thus, for example, the webpage provided to the client device 110-1 may contain code that is different than the webpage provided to client device 110-2. In an embodiment, the testers 150 may be operated by third party testing service providers that insert an incidental piece of code identifying their services and or containing test specifications.

The tracking server 130 is configured to monitor websites hosted by the plurality of web servers 120 to determine whether such websites are undergoing testing. The tracking sever 130 is further configured to identify tests and to collect data associated with such tests over time. Such data may include, but is not limited to, variations (or versions) tested previously, goals, goal values, and so on. The collected testing data can be analyzed and/or utilized by companies to improve the appearance, functionality, and/or content delivery of their websites. It should be appreciated that the tracking server 130 is configured to collect testing data of different multivariate, A/B, and split tests from different web servers 120, as well as tests programmed by different third party providers. Thus, collected data represents "cross-platform" testing data sets, such that the data sets can be used to drive accurate conclusions based on the nature of changes and their values.

In one embodiment, the tracking server 130 is configured to monitor websites and to collect testing data by crawling through the Internet and scanning each encountered webpage to determine if it is under testing. The crawling can be performed using conventional web crawling techniques. For example, a web crawling process typically starts with seed URLs. As the process initially visits the seed URLs, the process identifies all the hyperlinks in the webpage and adds them to the list of URLs to visit in a crawl frontier. URLs from the frontier are recursively visited according to a set of policies. The policies may be predetermined by the user of the system. The policies may include, but are not limited to, time of day, frequency, and so on. Typically, a web crawler implements optimization processes, but does not reduce the crawling time. The list of URLs of respective of webpages (or websites) encountered during the web crawling is saved. In an embodiment, the crawling is limited to a set of URLs of one or more websites wherein there is a specific interest to evaluate the testing of those URLs.

The tracking server 130 is further configured to scan webpages encountered during the crawling process to determine if the webpages are under a multivariate, A/B, or split test. In one embodiment, the tracking server 130 first checks to determine if the webpage should be scanned. That is, the tracking server 130 queries whether the respective URL or domain name has already been processed or does not need to be processed. The check may be performed by a list, e.g., a "black list" of URLs.

Then, for URLs that require processing, the tracking server 130 is configured to send a HTTP request to a URL and download the respective webpage. In one embodiment, URLs under the same domain names are simultaneously downloaded and processed. In yet another embodiment, a URL or a set of URLs are downloaded by different virtual clients (i.e., automated web clients capable of simulating full client side functionality of a webpage loading and processing as can be performed by a popular web browser) to analyze different versions of the same webpage.

The downloaded pages are analyzed to detect changes over time, changes in content delivered to the virtual clients, and/or presence of test code of known testing service providers. In an embodiment the analysis is performed offline, i.e., on downloaded pages rather than on a "live" website.

In one embodiment, the tracking server 130 is configured to detect changes over time by requesting and downloading the same webpage at predefined time intervals. Each webpage (downloaded at a certain instance) includes content, code, or page attributes that are extracted and saved. The extracted content, code, or page attributes of two subsequent webpages are compared to each other. Webpage attributes may include color schema, images, font style, font size, and so on. In an embodiment, the comparison is done using clustering techniques over large sets of samples.

In one embodiment, the tracking server 130 is also configured to detect changes over time by requesting and downloading the same webpage to two or more virtual clients (or browsers). The virtual clients may be recognized by a different web cookie, browser types, and/or IP address. The tracking server 130 is configured to compare the extracted content, code or page attributes of the webpages as displayed or downloaded to the different virtual clients. The content, code, lines or attributes detected to be different between two versions of the same page provide the testing data.

In one embodiment, the tracking server 130 is configured to detect tests based on code embedded by third party testing service providers. Typically, a testing service provider loads testing data via HTTP requests. Known testing services implemented or can be configured such that they provide all the variation in each request or one variation (selected on server side) in each request. This could be JavaScript references from the page or XmlHttpRequests to data sources. For known testing services, the webpage is analyzed to detect the format in which the testing data is defined by the service and to read such data directly. In an embodiment, this is achieved by loading a webpage in a virtual client and reading the HTML DOM, JavaScript values, and network data. In an exemplary embodiment, the same webpage is loaded many times to detect the distribution of the variation if such data is not continuously available in the webpage.

For home-brew tests or changes that are not comparative tests, the tracking server 130 is configured to simulate many web visitors to collect statistically significant amounts of data that are sufficient to determine what differences in the page are due to tests and what differences are due to personalization. Distributions for each difference among a large set of page views for a given webpage will be calculated. Based on correlation of distributions of the various changes and the type of distributions, the tracking server 130 estimates what changes are due to personalization and what changes are due to tests.

In one embodiment, the tracking server 130 is configured to detect tests and goals on webpages that are not publically available, i.e., webpages that require authentication in order to view. Accordingly, some webpages may be available only through a human action (e.g., login, checkout, CAPTCHA verification). In such cases, a user of the tracking server 130 can login manually to reach a certain "inner" page or provide a login script for the tracking server 130 to execute.

In one embodiment, the detected tests are collected and saved in the data warehouse 140. The collected testing data may include, but is not limited to, a test identifier (ID), test start time, service providers, and other identification parameters. The collected data further includes which pages on the website are undergoing testing, which variations are being tested, what share of traffic each variation acquires, the test goal, the value of the goal, the goal of the test, the selected page variation (when the test is completed), and the attributes of the page variant. The goal of the test is typically defined as part of the test code. The value of the goal is usually defined using unnamed units and can implicitly mean monetary value.

Figure 2:
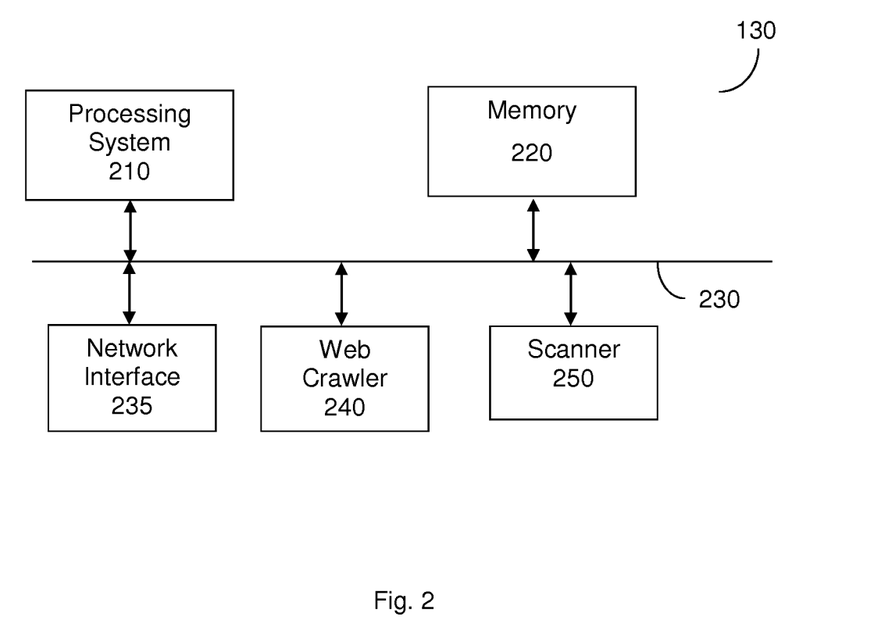
FIG. 2 is a schematic block diagram of a tracking server.

FIG. 2 shows an exemplary and non-limiting schematic block diagram of the tracking server 130 according to one embodiment. The tracking server 130 typically comprises a processing system 210 communicatively connected to a memory 220. In one implementation, the memory 220 contains instructions that, when executed by the processing system 210, results in the performance of, without limitations, the process for monitoring and gathering multivariate, A/B, and split tests from websites under testing. Specifically, the processing system 210 may include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 210 to perform the various functions described herein.

In an embodiment, the processing system 210 may include one or more processors. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

Further connected to a bus 230 of the server 130 is a network interface 235 allowing for bidirectional communication to and from the network 101. In an embodiment, the tracking server 130 further comprises a web crawler 240 configured to crawl through webpages starting from a seed URL or through webpages of a designated domain name. URLs detected by the web crawler 240 are saved in the memory 220.

The tracking server 130 also includes a test scanner 250 configured to analyze URLs provided by the crawler 240 to detect tests running on their respective webpages. The test scanner 250 can detect, extract, and gather multivariate, A/B, and split tests as discussed in detail above with regard to the tracking server 130.

The memory 220 may contain instructions that, when executed by the processing system 210, control the operation of the web crawler 240 and test scanner 250 to perform, the processed disclosed herein.

Figure 3:
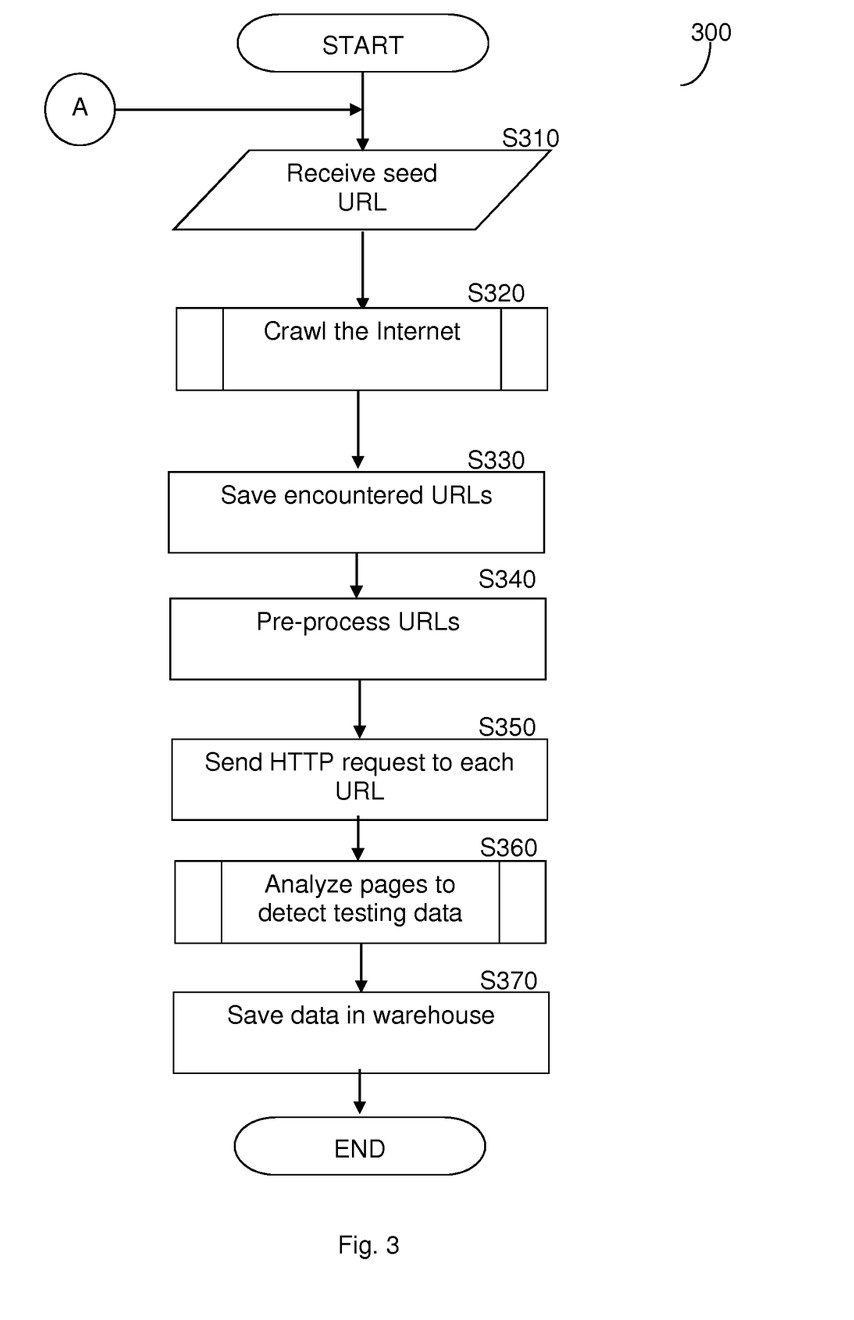
FIG. 3 is a flowchart illustrating a method for tracking multivariate testing and their impact on users according to one embodiment.

FIG. 3 shows a non-limiting and exemplary flowchart 300 illustrating a method for tracking multivariate testing and their impact on users according to one embodiment. In an embodiment, the method may be performed by the tracking server 130.

At S310, at least one seed URL is input to start the crawling process. The seed URL may be of a specific interest to a user of the system such as, for example, a URL of a competitor's website. At S320, a web crawling process is performed starting from the seed URL. At S330, URLs of webpages encountered during the crawling process are saved. In an embodiment, the URLs may be saved in the memory 220. Optionally, at S340, URLs are pre-processed to filter our URLs that may not include any testing information.

At S350, for each URL to be tested, one or more HTTP requests to the web server (identified by the URL) are sent to download the respective page. The HTTP request can be sent from different virtual clients (browsers) to render different page views on different browsers. Alternatively or collectively, the HTTP request can be sent at predefined time intervals to render different page views at different timings. At S360, the rendered webpages are analyzed to detect multivariate, A/B, and split tests. According to various embodiments, S360 includes scanning the download page views to detect changes in the page views' appearances over time, changes in content delivered to various different browsers, and the presence of testing services in the webpages. The various techniques for performing S360 are discussed above.

At S370, the analysis results, particularly the data related to the performed tests, are collected and saved in a data warehouse (e.g., the data warehouse 140). As noted above, for each test, the collected data includes, for example, a test identifier (ID), test start time, service providers, and other identification parameters. The collected data further includes which pages on the website are undergoing testing, the variations that are tested, what share of traffic each variation acquires, the test goal, the value of the goal, the goal of the test, the selected webpage variation (when the test is completed), and the attributes of the webpage variant.

In one embodiment, the collected data can be analyzed to provide various analytical measures, for example, what is the best appearance for websites catered for a certain group of users (e.g., fashion shopping, social media websites, etc.). The analysis and the provided measures may be performed with respect to a specific website (e.g., a competitor website) or websites in a certain business category. In yet another embodiment, a user interface is provided to access the collected testing data stored in the data warehouse 140.

Figure 4:
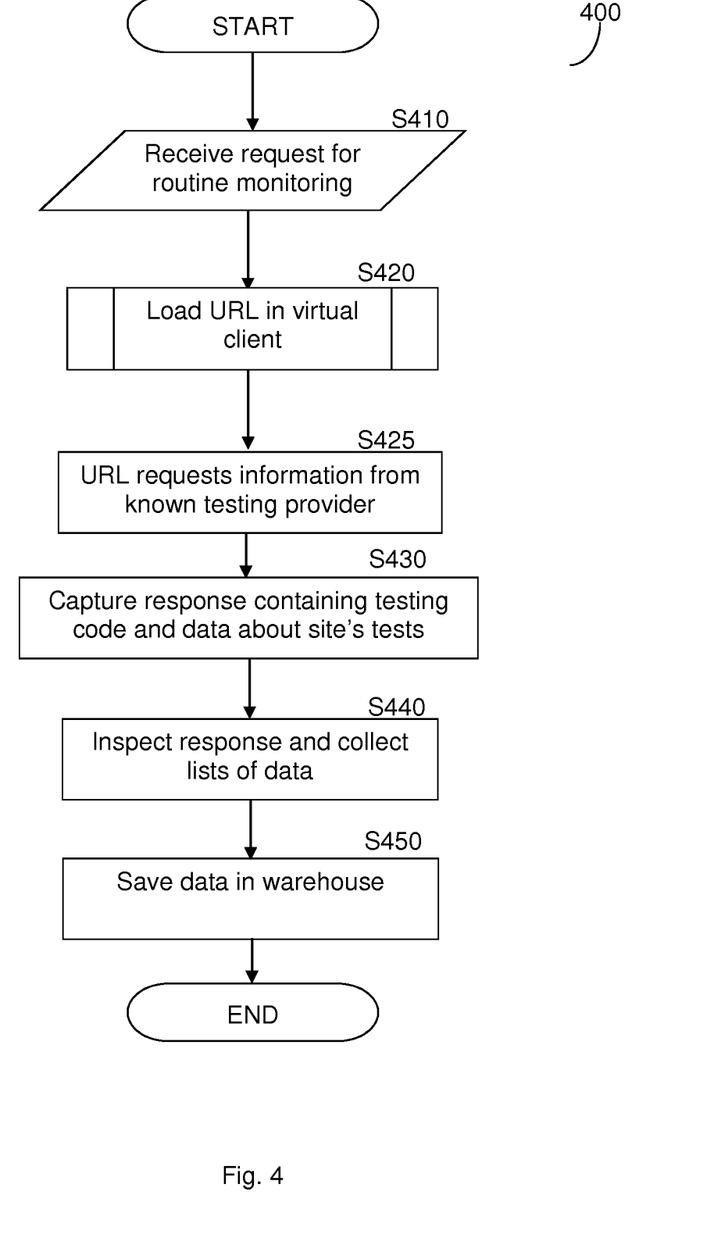
FIG. 4 is a flowchart illustrating a method for obtaining data about a test performed by a known testing provider.

FIG. 4 shows an exemplary and non-limiting flowchart 400 illustrating a method for obtaining data about a test performed by a testing provider. A testing provider may be designated in a predefined list of such provider. Each testing provider may be designated with its respective signature code identifying a particular test performed by the provider.

At S410, a request to perform a routine monitoring for a particular URL (e.g., http://site.com/) is received. In an embodiment, the request may be received by the tracking server 130. At S420, a webpage corresponding to the particular URL is loaded to a virtual client.

At S425, while the URL is being loaded, a request is made to a known test provider (e.g., provider.com, where provider's home page is http://provider.com/) for a resource file respective of the URL. In an embodiment, this request may be made by the virtual client. This resource file may be, but is not limited to, a JavaScript resource (e.g., http://provider.com/site.com.js). The resource file is configured such that it contains code and information for tests of the site.com.

At S430, the response to the request is captured and passed to the tracking server 130. In an embodiment, the response is captured and passed by the virtual client. At S440, the data in the response is inspected, for example, by the tracking server 130. In a non-limiting example, examination of the file shows that a variable called, for example, "data," can be found within the response. The variable "data" is an object that may contain, but is not limited to, details such as goals, tests, variations, segments, etc. The tracking server 130 is configured to collect lists of data from the resource file (e.g., data.goals or data.tests, which are lists of goals and tests, respectively) and, at S450, the data lists are stored in the data warehouse 140.

Figure 5:
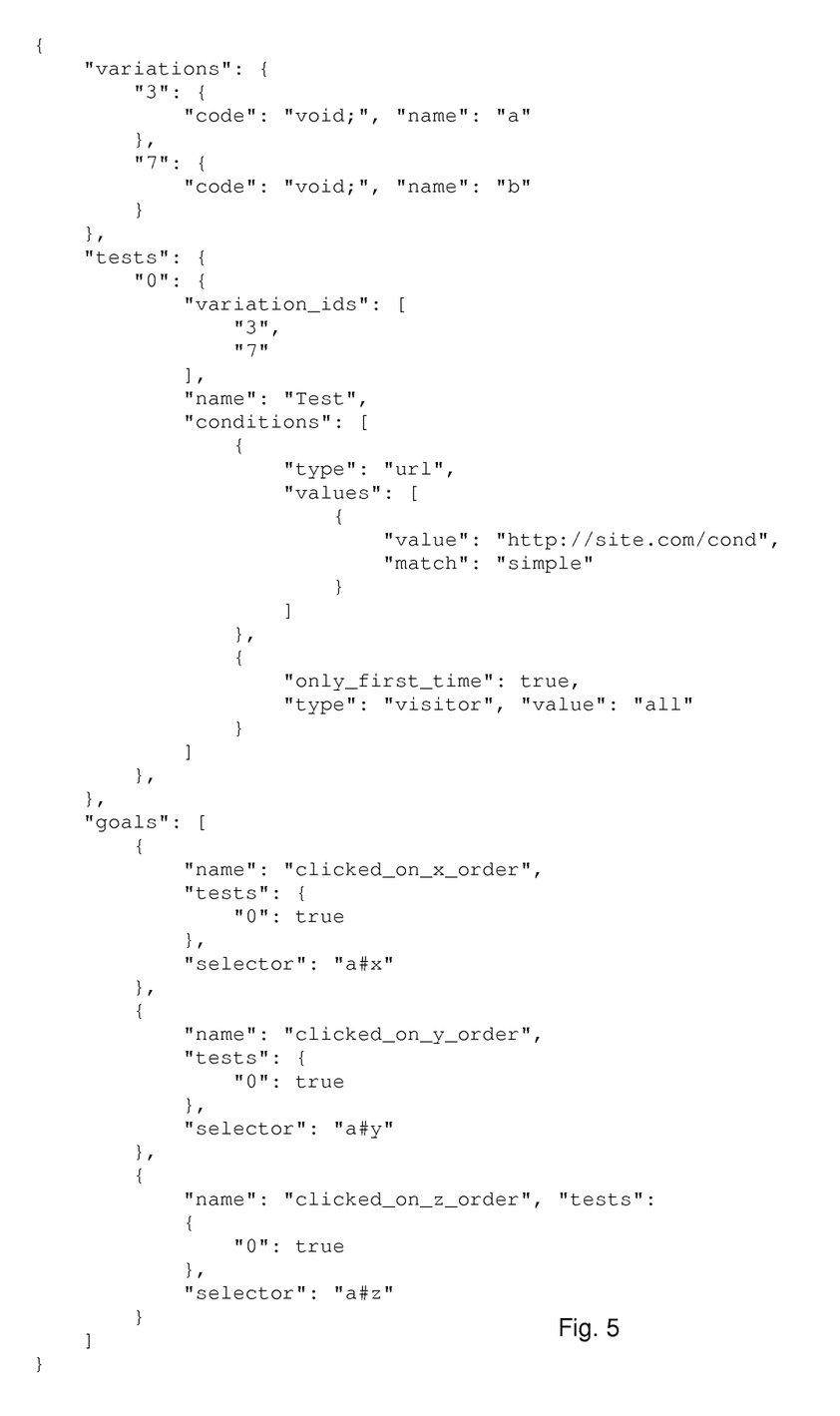
FIG. 5 is a non-limiting example of a simplified object containing test information for a website.

FIG. 5 shows a non-limiting example of a simplified object containing test information for a website. The object contains information related to the variations of the website being utilized, conditions for the tests, and goals of testing. In the non-limiting example, two variations of the website were tested by the system, with conditions related to URLS and first time visitors. In FIG. 5, the goals being tracked include clicking on "order" icons for items x, y, and z, respectively.

Figure 6:
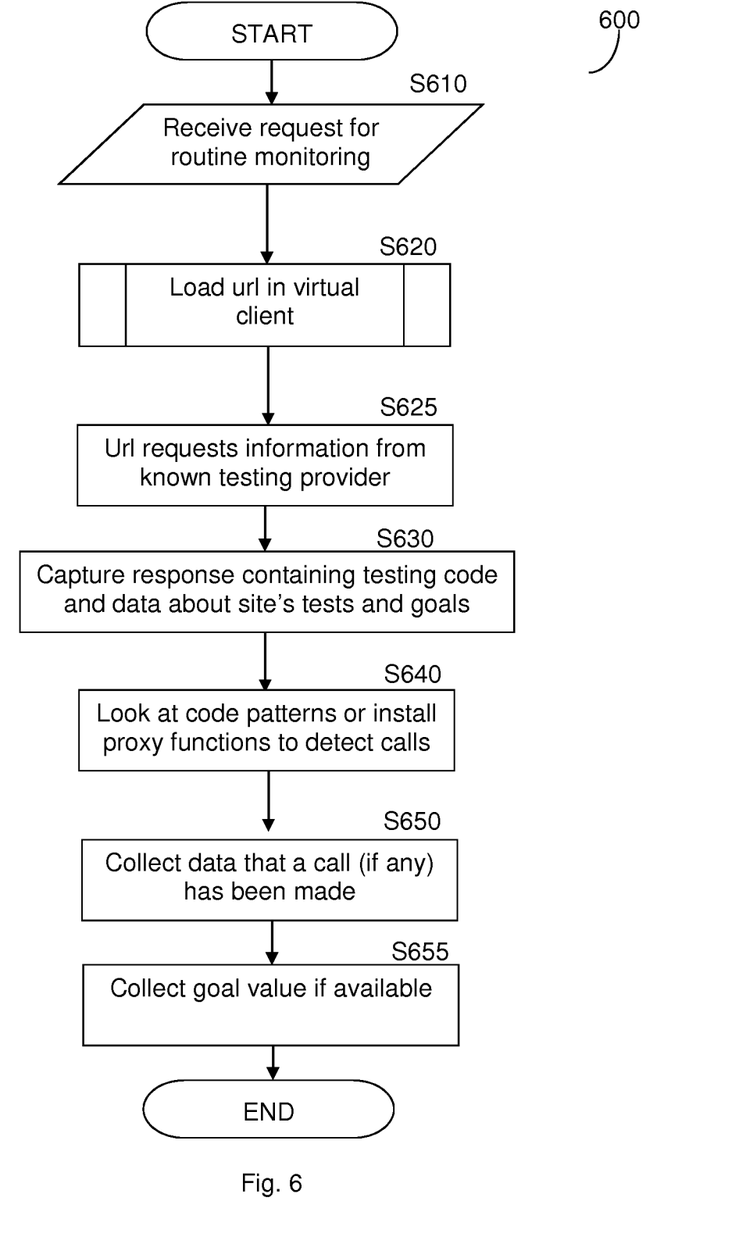
FIG. 6 is a flowchart illustrating a method for detecting announcements of goals of the multivariate tests.

FIG. 6 shows a non-limiting and exemplary flowchart 600 illustrating a method for detecting announcements of goals for specific test services. At S610, a request to perform routine monitoring for a particular URL (e.g., http://site.com/) is received at the tracking server. At S620, the particular URL is loaded to a virtual client.

At S625, while the URL is loading, a request to a known test provider (e.g., provider.com, where provider's home page is http://provider.com/) is made respective of the URL. In an embodiment, this step may be performed by the virtual client. This resource file may be, but is not limited to, a JavaScript resource (e.g., http://provider.com/site.com.js). The resource file is configured such that it contains code and information for tests of the site.com.

At S630, the response to the request is captured and passed to the tracking server 130. In an embodiment, this step may be performed by the virtual client. At S640, the response is examined for appearance of particular code patterns or using proxy functions that are installed on top of the functions (e.g., provider.trackEvent) already placed in effect by the known providers to determine whether a call to declare a goal exists. In an embodiment, this step may be performed by the tracking server 130. If a call is detected, at S650, the data is collected by the system indicating that the call has been made. Additionally, when a call occurs, one of the parameters might be a goal value. If goal value is an available parameter, at S655, the goal value is collected by the system.

Figure 7:
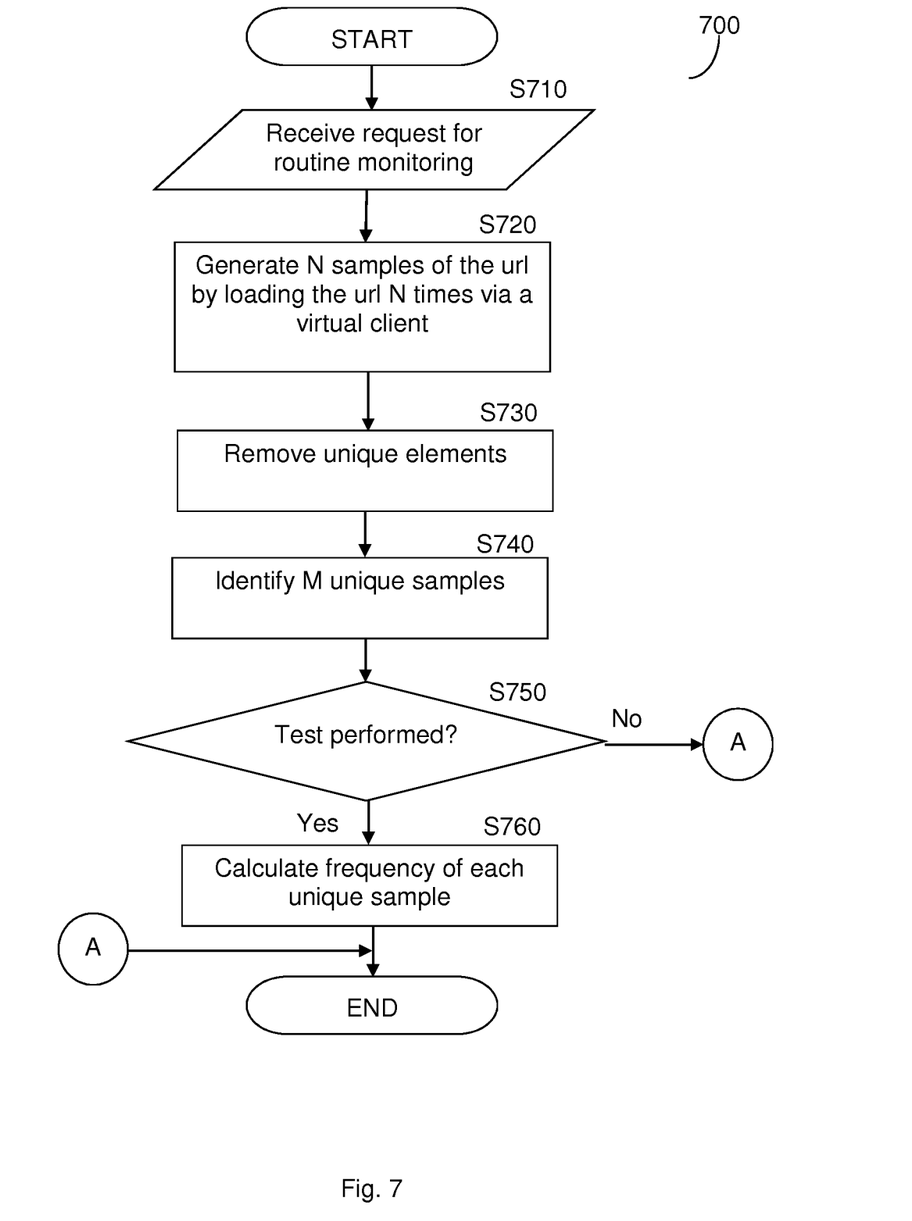
FIG. 7 is a flowchart illustrating a method for detecting multivariate tests on website that does not use a known testing service.

FIG. 7 shows a non-limiting and exemplary flowchart 700 illustrating a method for detecting multivariate tests on a website that does not use a known testing service according to an embodiment. The method may be performed by the tracking server 130. At S710, a request to perform routine monitoring for a particular URL (e.g., http://site.com/) is received. At S720, the URL is loaded a predefined number of times (e.g., 100). Each of the specific instances of loading of the URL is referred to as a "sample." Generating samples of the URL may include, but is not limited to, loading the URL fully, capturing the redirect URL if the URL is redirected, or capturing the resulting HTML/source HTML of the page view if the URL is not redirected, capturing the result render image and capturing the set of cookies.

At S730, the results of the sample generation are preprocessed to at least remove elements that are unique in each sample. At S740, based on the preprocessed results, M unique samples out of the generated N samples are identified. Each unique sample will be referred to as a "test variant." If each of the unique samples 1 through M occurs in a sequential order within the samples 1 through N, it is determined that the URL changed solely due to the passage of time, and that no test was in progress during that timeframe. In that event, the result that no test has occurred is returned.

At S750, it is checked whether a test has been performed on the URL, and if so execution continues with S760, otherwise execution terminates. At S760, the frequency of occurrence of each of the unique samples 1 through M is calculated by dividing the number of appearances of each of those unique samples by N, the total number of samples. The calculation results may be saved in the data warehouse 140.

Figure 8:
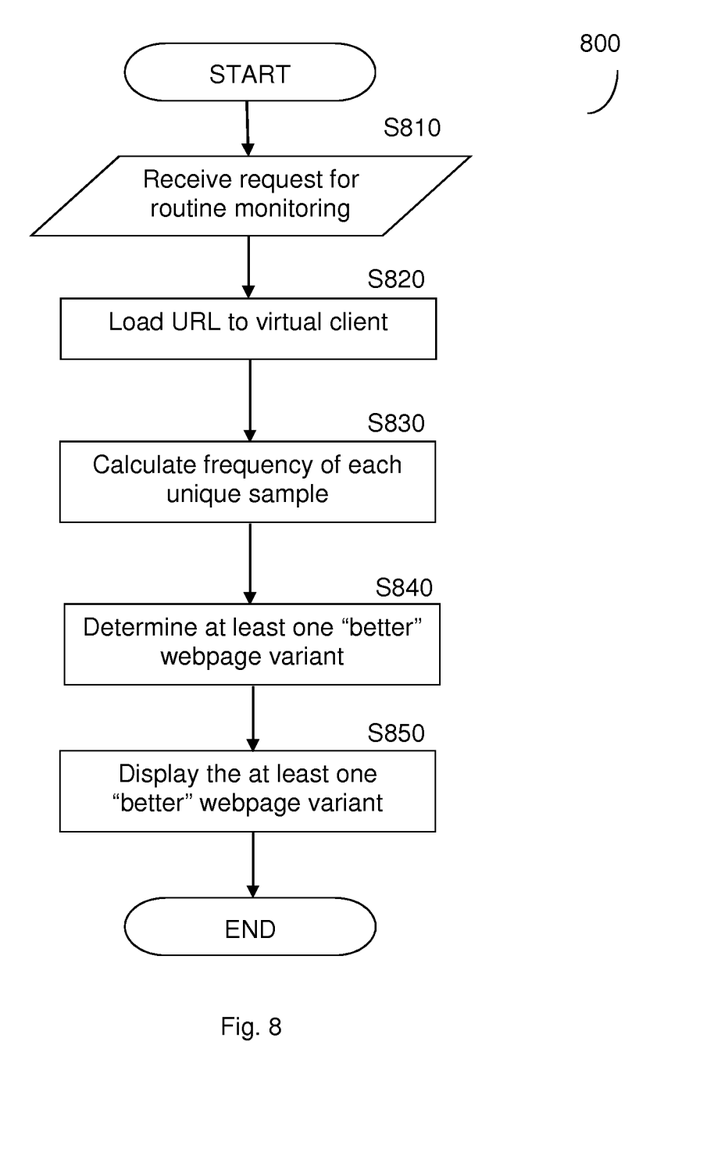
FIG. 8 is a flowchart illustrating a method for evaluating multivariate test webpages in a virtual client.

FIG. 8 shows an exemplary and non-limiting flowchart 800 illustrating a method for evaluating multivariate test webpages in a virtual client. At S810, a request to perform routine monitoring for a particular URL (e.g., http://site-.com/) is received. At S820, the URL is loaded to a virtual client. At S830, the frequency of the occurrence of unique samples is calculated in accordance with FIG. 7. Alternatively, the frequency data is obtained from data warehouse 140.

At S840, respective of the frequency data at least one "better" webpage variant is determined by a tester 150. Multiple testers 150 may be employed for multiple tested variations, or one tester 150 may perform multiple calculations. The tester(s) 150 may be configured as described herein above with respect to FIG. 1.

At S850, the at least one "better" webpage variant is displayed to the user of the system. In an embodiment, the at least one webpage variant is displayed on the client device 120, but any similar displaying means may be employed. Without limiting the scopes of the disclosed embodiments, a "better" webpage variant will likely generate a higher frequency of desirable behavior. The desirable behavior of a user (webpage viewer) may be translated to purchases, engagements, sign ups, lead generation, attempts to contact the site owner through a "contact us" link, etc., on the website.

The various embodiments disclosed herein may be implemented as hardware, firmware, software, or any combination thereof. Moreover, the software is preferably implemented as an application program tangibly embodied on a program storage unit or non-transitory computer readable medium consisting of parts, or of certain devices and/or a combination of devices. A non-transitory computer readable medium is any computer readable medium except for a transitory propagating signal. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for tracking and gathering data respective of multivariate testing on a plurality of webpages, comprising:
   crawling through a plurality of servers hosting the plurality of webpages;
   for each uniform resource locator (URL) of a webpage of the plurality of webpages encountered during the crawling:
      sending a request to download the webpage identified by the URL;
      downloading at least one page view of the webpage;
      analyzing the at least one downloaded page view to identify data related to at least a multivariate test; and
      saving data identifying the at least multivariate test performed in the plurality of webpages in a data store.

2. The method of claim 1, further comprising:
   filtering the URLs encountered during the crawling;
   saving a set of filtered URLs; and
   processing only the set of filtered URLs.

3. The method of claim 1, wherein sending the request to download the webpage identified by the URL further comprises:
   causing at least one virtual client to send the request, wherein each virtual client downloads a different page view of the webpage.

4. The method of claim 1, wherein sending the request to download the webpage identified by the URL further comprises:
   causing a single client to send the request at predefined time intervals to render different multiple page views at different timings.

5. The method of claim 1, wherein analyzing the at least one downloaded page view further comprises:
   scanning the at least one downloaded page view to detect changes among page views associated with webpages of the plurality of webpages, wherein the changes are related to at least one of: appearances over time, and content displayed in the page views.

6. The method of claim 5, further comprising:
   generating a unique sample for each page view by removing unique elements included in each page view;
   checking if the unique samples are generated in a sequential order;
   determining that the at least a multivariate test is not performed, when the unique samples are generated in a sequential order; and
   computing a frequency of occurrence of each of the unique samples, when the at least a multivariate test is performed.

7. The method of claim 1, wherein analyzing the at least one downloaded page view further comprises:
scanning the at least one downloaded page view to detect testing coded embedded by a testing service provider.

8. The method of claim 1, further comprising:
sending a request to the testing service provider to receive a resource file respective of the URL;
capturing a response sent from the testing service provider; and
inspecting the response to detect data related to the at least a multivariate test, wherein the data included in the response specifies at least goals, tests, variations, and segments.

9. The method of claim 1, wherein the data related to the at least a multivariate test includes at least one of: a test identifier (ID), a test start time, a testing service provider, a website under testing, tested variations, a test goal, a value of the test goal, a selected webpage variation, and attributes of the webpage variant.

10. The method of claim 9, wherein the at least a multivariate test further includes any one of: A/B tests, and split tests.

11. The method of claim 1, further comprising:
analyzing the data saved in the database to provide various analytical measures about users' preferences with respect to each of the plurality of websites.

12. A non-transitory computer readable medium having stored thereon instructions for causing one or more processing units to execute a process for tracking and gathering data respective of multivariate testing on a plurality of webpages, the process comprising:
crawling through a plurality of servers hosting the plurality of webpages;
for each uniform resource locator (URL) of a webpage of the plurality of webpages encountered during the crawling:
sending a request to download the webpage identified by the URL;
downloading at least one page view of the webpage;
analyzing the at least one downloaded page view to identify data related to at least a multivariate test; and
saving data identifying the at least multivariate test performed in the plurality of webpages in a data store.

13. A system for tracking and gathering data respective of multivariate testing on a plurality of webpages, comprising:
a processing system; and
a memory coupled to the processing system, the memory containing instructions that, when executed by the processor, configure the system to:
crawl through a plurality of servers hosting the plurality of webpages;
for each uniform resource locator (URL) of a webpage of the plurality of webpages encountered during the crawling:
send a request to download the webpage identified by the URL;
download at least one page view of the webpage;
analyze the at least one downloaded page view to identify data related to at least a multivariate test; and
save data identifying the at least multivariate test performed in the plurality of webpages in a data store.

14. The system of claim 13, wherein the system is further configured to:
filter the URLs encountered during the crawling;
save a set of filtered URLs; and
process only the set of filtered URLs.

15. The system of claim 13, wherein the system is further configured to:
cause at least one virtual client to send the request, wherein each virtual client downloads a different page view of the webpage.

16. The system of claim 13, wherein the system is further configured to:
cause a single client to send the request at predefined time intervals to render different multiple page views at different timings.

17. The system of claim 13, wherein the system is further configured to:
scan the downloaded page views to detect changes among the page views, wherein the changes are related to at least one of: appearances over time, and content displayed in the page views.

18. The system of claim 17, wherein the system is further configured to:
generate a unique sample for each page view by removing unique elements included in each page view;
check if the unique samples are generated in a sequential order;
determine that the at least a multivariate test is not performed, when the unique samples are generated in a sequential order; and
compute a frequency of occurrence of each of the unique samples, when the at least a multivariate test is performed.

19. The system of claim 13, wherein the system is further configured to:
scan the downloaded page views to detect testing coded embedded by a testing service provider.

20. The system of claim 13, wherein the system is further configured to:
send a request to the testing service provider to receive a resource file respective of the URL;
capture a response sent from the testing service provider; and
inspect the response to detect data related to at least a multivariate test, wherein the data included in the response specifies at least goals, tests, variations, and segments.

21. The system of claim 13, wherein the data related to the at least a multivariate test includes any of: a test identifier (ID), a test start time, a testing service provider, a website under testing, tested variations, a test goal, a value of the test goal, a selected webpage variation, and attributes of the webpage variant.

22. The system of claim 21, wherein the at least a multivariate test further includes any one of: A/B tests, and split tests.

23. The system of claim 13, wherein the system is further configured to:
analyze the data saved in the database to provide various analytical measures about users' preferences with respect to each of the plurality of websites.

* * * * *

(12) INTER PARTES REVIEW CERTIFICATE (3048th)
United States Patent
Yavilevich

(10) Number: US 9,792,365 K1
(45) Certificate Issued: Mar. 23, 2023

(54) METHOD AND SYSTEM FOR TRACKING AND GATHERING MULTIVARIATE TESTING DATA

(71) Applicant: Arik Yavilevich

(72) Inventor: Arik Yavilevich

(73) Assignee: CONTENT SQUARE ISRAEL LTD.

Trial Number:

IPR2021-00530 filed Feb. 12, 2021

Inter Partes Review Certificate for:

Patent No.: 9,792,365
Issued: Oct. 17, 2017
Appl. No.: 14/584,384
Filed: Dec. 29, 2014

The results of IPR2021-00530 are reflected in this inter partes review certificate under 35 U.S.C. 318(b).

INTER PARTES REVIEW CERTIFICATE
U.S. Patent 9,792,365 K1
Trial No. IPR2021-00530
Certificate Issued Mar. 23, 2023

AS A RESULT OF THE INTER PARTES REVIEW PROCEEDING, IT HAS BEEN DETERMINED THAT:

Claims 6 and 18 are found patentable.

Claims 1-5, 7-17 and 19-23 are cancelled.

\* \* \* \* \*